(12) United States Patent  (10) Patent No.: US 8,766,595 B2
Gaul et al.  (45) Date of Patent: Jul. 1, 2014

(54) CONTROL OF CHARGING STATIONS

(75) Inventors: Armin Gaul, Selm (DE); Ingo Diefenbach, Unna (DE)

(73) Assignee: RWE AG, Essen (DE)

(*) Notice: Subject to any disclaimer, the term of this patent is extended or adjusted under 35 U.S.C. 154(b) by 356 days.

(21) Appl. No.: 13/369,737

(22) Filed: Feb. 9, 2012

(65) Prior Publication Data

US 2012/0146583 A1   Jun. 14, 2012

Related U.S. Application Data

(63) Continuation of application No. PCT/EP2010/059200, filed on Jun. 29, 2010.

(30) Foreign Application Priority Data

Aug. 10, 2009 (DE) .................. 10 2009 036 816

(51) Int. Cl.
  *H02J 7/00* (2006.01)
  *H02J 3/32* (2006.01)
  *B60L 11/18* (2006.01)

(52) U.S. Cl.
  CPC ............... *H02J 3/32* (2013.01); *Y02T 10/7291* (2013.01); *Y02T 10/7005* (2013.01); *Y02T 90/14* (2013.01); *Y02T 90/163* (2013.01); *B60L 2240/70* (2013.01); *Y02T 90/128* (2013.01); *Y02E 60/721* (2013.01); *Y04S 10/126* (2013.01); *Y02T 10/7088* (2013.01); *Y02T 90/16* (2013.01); *B60L 11/1844* (2013.01); *B60L 11/1838* (2013.01)
  USPC ............................ 320/109; 320/104; 320/126

(58) Field of Classification Search
  CPC ..................................................... H02J 7/0027
  USPC ......................................................... 320/109
  See application file for complete search history.

(56) References Cited

U.S. PATENT DOCUMENTS

| | | |
|---|---|---|
| 2002/0024332 A1 | 2/2002 | Gardner |
| 2002/0132144 A1 | 9/2002 | McArthur et al. |
| 2004/0130292 A1 | 7/2004 | Buchanan et al. |
| 2005/0034023 A1 | 2/2005 | Maturana et al. |
| 2009/0043520 A1 | 2/2009 | Pollack et al. |
| 2009/0189456 A1 | 7/2009 | Skutt |

FOREIGN PATENT DOCUMENTS

| | | |
|---|---|---|
| CA | 2672422 | 6/2008 |
| CN | 101257218 A | 9/2008 |
| DE | 695 09 529 T2 | 10/1999 |
| EP | 0 456 872 A1 | 11/1991 |
| EP | 1 263 108 A1 | 12/2002 |
| EP | 2 048 761 A1 | 4/2009 |
| EP | 2 061 131 A1 | 5/2009 |
| EP | 2056420 A1 | 5/2009 |
| JP | 2008199752 A | 8/2008 |
| WO | WO 2007/065135 A2 | 6/2007 |

*Primary Examiner* — Edward H Tso
*Assistant Examiner* — Ahmed Omar
(74) *Attorney, Agent, or Firm* — Reinhart Boerner Van Deuren P.C.

(57) ABSTRACT

Method and device for controlling charging stations for electrical vehicles. In order to minimize peak power demands in at least two charging stations 10 combined into a group 12, actual charging parameters are exchanged 32 within the charging stations 10 within the group 12, a load prediction for the group 12 is created 34 depending on at least the actual charging parameters, and setpoint charging parameters for the charging stations 10 of the group 12 are determined 38 depending on the load prognosis.

14 Claims, 3 Drawing Sheets

CONTROL OF CHARGING STATIONS

CROSS-REFERENCE TO RELATED PATENT APPLICATIONS

This patent application is a continuation of pending PCT Patent Application No. PCT/EP2010/059200, filed Jun. 29, 2010, which claims the benefit of German Application No. 102009036816.7, filed Aug. 10, 2009, the entire teachings and disclosure of which are incorporated herein by reference thereto.

FIELD OF THE INVENTION

The subject-matter relates to a method for controlling charging stations and to a charging station and to a low-voltage transformer.

BACKGROUND OF THE INVENTION

The distribution of electrically driven vehicles will increase rapidly in the near future. With the distribution of electrical vehicles which are driven by an electric motor, however, it is necessary to ensure that they can be supplied with energy in the simplest way. To this end, a functioning infrastructure must be made available.

In particular, the opportunity must be provided to obtain energy for electrical vehicles in public areas. With the ranges currently available for electrical vehicles, between 50 and a few 100 km, it is also necessary for charging of the vehicles to be possible outside the domestic environment. To this end, charging stations must be made available in public and semi-public areas, for example multi-storey car parks or company parking areas, in order to provide constant availability of energy for electrical vehicles through a supply network. This availability is a crucial criterion for the acceptance of electrical vehicles.

For the acceptance of electrical vehicles, however, it is also crucially important for the supply network to make charging energy available at any time. This, however, means that the network capacity must be increased for the rising energy demand due to electrical vehicles. The charging stations necessary for this are generally allocated to a common transformer station in the low-voltage range. Typically, transformer stations in the low-voltage range have a station power of between 400 and 1000 Kva. This station power must be sufficient for supplying the already existing consumers, for example households, and in addition for the charging stations arranged in the supply region of the transformer station.

Previously known charging stations suitable for operation, however, generally have two or more outlets at which high powers, for example a power of 44 Kva, can respectively be made available. Under these premises, the maximum station power may already be exhausted when simultaneously operating 5 to 10 charging stations within a supply region of a transformer station. This, however, could lead to supply bottlenecks. In particular, it is necessary to ensure that households are constantly supplied with electrical energy. This supply must not be compromised by charging electrical vehicles at charging stations.

For this reason, it was an object of the subject-matter to provide a method and a device which make it possible to control charging stations so as to reduce the burden on the supply network.

SUMMARY OF THE INVENTION

This object is according to the subject-matter achieved by a method according to claim 1. This method involves preferably automatic grouping of at least two charging stations into a group.

As already mentioned above, a plurality of charging stations may be allocated to a common transformer station. A multiplicity of charging stations allocated to a transformer station may in this case form a group. Other groupings are also possible, for example charging stations locally neighbouring one another or charging stations which are allocated to a particular energy supplier or service provider. Thus, it is readily possible for different groups of charging stations to be formed within a transformer station. The groupings may be static or dynamic. In the case of static groupings, when a charging station is initially connected, it may be allocated either manually or automatically to a group of charging stations. This allocation may be carried out by means of charging station detection. In the case of dynamic groupings, during operation of a charging station, it may respectively be allocated automatically to one of various groups.

The method furthermore comprises exchanging at least actual charging parameters of the charging stations within the group. Actual charging parameters may, for example, be information about the electrical power presently made available at a charging station. For example, a vehicle may currently be drawing a power of 10 kVA. This information may constitute an actual charging parameter. Other actual charging parameters will be explained in more detail below.

According to the subject-matter, the actual charging parameters are exchanged within the group. It is therefore possible for the actual charging parameters of each of the charging stations to be known in the group. An actual charging parameter may also be information that no charging is presently being carried out and a charging station is drawing 0 kVA of power.

According to the invention, at least one load prediction (prognosis) is created for the group from at least the actual charging parameters. A load prediction may, for example, contain information about how the electrical load within the group, i.e. the energy taken by the charging stations, will change in the future. For example, with the aid of the actual charging parameters, it is possible to predict the energy which must be made available in half an hour, one hour or in two hours, as well as the capacity which is still available in the group. The actual charging parameters may, for example, also contain information about the power presently made available in combination with the energy still required by a vehicle. From this information, for example, it is possible to ascertain how much longer a charging process will last. With this information, in a load prediction, it is possible to establish that a particular charging station will not take any more electrical energy at a particular time since the charging process presently taking place will then be completed.

With the aid of the load prediction which has been created, reference charging parameters (setpoint charging parameters) can be determined for the charging stations of the group. These may be calculated from the load prediction. With the aid of the reference charging parameters, the available station power can be distributed intelligently between the charging stations contained in the group. The intelligent distribution may consist in reducing the power which can be taken by each individual charging station to a particular maximum value. In the reference charging parameters, it is also possible to determine that a first power is allowed to be taken at a charging station in a first period of time and a second power, different from the first power, is allowed to be taken in a second period of time.

For instance, the following example can be made. An electrical vehicle typically requires 15 kWh of electrical energy for a range of 100 km. These 15 kWh must be recharged daily by the customers when they have a mileage of about 100 km a day. Assuming that 120 vehicles have to be charged with 15 kWh in a transformer station region, this gives a total energy demand of 1800 kWh/day.

Typically, the vehicles are parked for 18 hours and driven for only 4 hours per day. The required power of 15 kWh can therefore be recharged over 18 hours in the day. Without a load prediction and the determination of reference charging parameters, it may happen that almost all the vehicles take electrical energy for charging at the same time. Particularly in the evening, when the customers come home and connect their vehicles to the charging stations, an abrupt demand for electrical power arises. If the maximum power were to be made immediately available, then the daily energy demand of 1800 kWh would have to be made available in about 1 hour. This would result in a power demand of 1800 kVA, which would be higher than the station power of the transformer station. An upgrading of the transformer stations would therefore be necessary, merely in order to be able to charge the electrical vehicles.

An intelligent charging method according to the subject-matter, however, with the aid of the load prognosis and with the help of the reference charging parameters, determines that the vehicles are not immediately charged with the full available power, but instead receive the required energy over their total parking time. Thus, assuming a daily energy demand of 1800 kWh and a parking time 18 hours, there is an instantaneous power demand of merely 100 kVA (1800 kWh/18 h). It would thus be possible to charge a multiplicity of electrical vehicles with only one transformer station, without the transformer station reaching its power limit.

With the aid of the method according to the subject-matter, it is thus possible to reduce the need for a network upgrade and at the same time make the required energy reliably available to the electrical vehicles.

A further aspect is a charging station for electrical vehicles, comprising allocation means for grouping the charging station into a group of at least two charging stations and communication means for exchanging at least actual charging parameters within the group, and for receiving reference charging parameters in order to determine charging parameters for the charging of electrical vehicles.

A further aspect is a charging station for electrical vehicles, comprising allocation means for grouping the charging station into a group of at least two charging stations, communication means for receiving at least actual charging parameters from charging stations of the group, computation means for creating a load prediction for the group as a function of at least the received actual charging parameters, and for determining reference charging parameters for the charging stations of the group as a function of the load prediction, wherein the communication means being adapted to send the reference charging parameters to charging stations of the group.

A further aspect is a low-voltage transformer station, comprising allocation means for grouping charging stations into a group of at least two charging stations, communication means for receiving at least actual charging parameters from charging stations of the group, computation means for creating a load prediction for the group as a function of at least the received actual charging parameters, and for determining reference charging parameters for the charging stations of the group as a function of the load prediction.

A further aspect is a system comprising a charging station as described above and/or a low-voltage transformer station described above.

According to an embodiment, it is proposed that the generation of the load prediction is additionally dependent at least on a daily load curve of at least one charging station in the group and/or a weekly load curve of at least one charging station in the group. As a function of past data, it is possible to estimate the energy demand in the region of a transformer station. It is thus possible to predict which power must be made available at which time and with which probability. Knowledge based on historical data may be collated in a daily, weekly, monthly or annual load curve. Thus, with the aid of a daily load curve, it is possible to determine the most probable power demand course during a day. A weekly load curve makes this possible in the course of a week. With the aid of the information which can be determined from a load curve, it is for example possible to establish together with the actual charging parameters the electrical power which must be made available in one hour, two hours or several hours. If it is found that the required power comes close to the maximum transformer station power or exceeds it, then with the aid of the reference charging parameters such an overshoot can be prevented by establishing in the reference charging parameters that only a particular maximum power is allowed to be taken at a charging station at a particular time. For example, it may be established that at most 4 kVA, 5 kVA, 10 kVA or 15 kVA or other powers are allowed to be taken from the charging stations by an electrical vehicle at a particular time.

Inside a vehicle, a charging regulator may have knowledge of the state of charge of a battery. The charging regulator may furthermore have knowledge about the electrical power currently made available. With this information, and for example with further information about the battery temperature, a charging regulator can create a charging prediction for an electrical vehicle. For example, a charging regulator may predict how long a charging process will still last until the battery has reached a predefined state of charge. The charging regulator may also determine the appearance of a current load curve for charging the electrical vehicle over the remaining charging duration. Thus, the charging regulator may for example establish that the required amperage at the end of the charging process will be reduced and there is therefore a falling current load curve. For this reason, according to an advantageous embodiment, it is proposed that the compilation of the load prediction is additionally dependent on at least one charging prediction of an electrical vehicle, the charging prediction of an electrical vehicle comprising at least a charging duration and/or a current load curve. This charging prediction may advantageously be transmitted from the charging regulator, or the electrical vehicle, to the charging station. The charging station can communicate this information in the group, so that with the aid of the charging prediction it is possible to create an improved load prediction.

According to an embodiment, it is proposed that the actual charging parameters of at least one charging station contain at least information about the present charging amperage and/or about a charging regulator of an electrical vehicle connected to the charging station. With the aid of the information about the present charging amperage, it is possible to determine the charging power currently obtained by the electrical vehicle. If there is knowledge about the charging regulator being used, then for example it may be deduced that the charging amperage varies as a function of time when the charging regulator executes a dynamic charging current load curve. Furthermore, for example, information about the charging regulator makes it possible to deduce whether the charging regulator allows the charging parameters to be modified over the charging period. When determining the load prediction or when determining the reference parameters, this information can then provide the opportunity to modify the actual parameters of the associated electrical vehicle over the charging period, so that different charging parameters are made available to an electrical vehicle during the charging. At a time when there is a low load in the group, for example, an electrical vehicle may be charged with an high amperage and a high charging power, and with a low amperage when there is a high load in the group. If the charging regulator permits modification of these parameters and if the load prediction entails the need to modify these parameters, then this can be done if the reference charging parameters so require.

According to an advantageous exemplary embodiment, it is proposed that the actual parameters are exchanged at intervals and the load prediction and/or the reference parameters are modified adaptively as a function of the present actual parameters. It is therefore possible to modify the load prediction and the must parameters at intervals, preferably regularly, and adapt them to the present situation within the group. If for example a vehicle does not behave according to the reference parameters, for example when it is drawing too high an amperage, this can be detected in the actual parameters and the reference parameters can be adapted.

According to an embodiment, it is also proposed that the reference charging parameters are communicated within the group and that a charging station negotiates charging parameters with an electrical vehicle as a function of the reference charging parameters. If it is found in the load prediction that an increased load is probable in the near future, then the must charging parameter may take account of this and, for example, determine that a maximum charging current strength of 16 A is allowed. If such a must charging parameter has been communicated within the group and an electrical vehicle connects to a charging station, then it can be established in the charging parameters which the charging station negotiates with the electrical vehicle that the electrical vehicle is only allowed to be charged with 16 A. The electrical vehicle, or the computer arranged in the electrical vehicle, may accept this charging parameter and begin to charge, or decline. If this charging parameter is declined, then the charging is not started at all. An overload in the group can therefore be avoided with the aid of the reference charging parameters.

According to an embodiment, it is also proposed that the reference charging parameters contain at least information about an maximum amperage, a charging time, a charging duration, a current load curve and/or a quantity of energy. As explained above, for example, an maximum amperage, for example 16 A, 20 A, 30 A or the like, can be established in the reference charging parameters. A charging time may, however, also be established with the aid of the reference charging parameters. Thus, for example, it is possible to determine that charging is only allowed to take place in a particular time slot and is not allowed to begin immediately. Thus, for example, a time during the night may be determined for the charging. A charging duration may also be determined. Thus, for example, when a high load is expected in two hours but there is currently a low load, and the vehicle merely requires a small quantity of energy, a charging duration of one hour may be established and charging may be carried out with an maximum amperage in this hour. A current load curve may also be established, which establishes for example that charging is only allowed to be carried out with an low amperage at the beginning of a charging process, for example when there is a high load in the group, and that the amperage is increased at the end of a charging process when it has been predicted that there will be a low load in the group. Lastly, the quantity of energy to be drawn may also be established.

Reference parameters may change during a charging phase. With suitable charging regulators which permit modification of charging parameters, according to an embodiment, it is proposed that in the event of varying reference charging parameters the charging parameters are renegotiated with the electrical vehicle during a charging phase. Thus, in the event of an unexpectedly high load, for example, it may be negotiated with an electrical vehicle that it thereupon only charges with a low amperage. This may be done during a charging process already in progress.

According to an embodiment, it is proposed that at the start of a charging process, information about a required quantity of energy, a preferred charging duration, a preferred charging time and/or a charging regulator is sent from an electrical vehicle to a charging station. This function may possibly exist only in newer vehicles. In this case, the charging station may make an assumption about the charging duration and the charging time as well as the current load curve. At least a maximum charging amperage, a charging period, a charging duration and/or a maximum charging duration may also be determined and communicated to the electrical vehicle by the charging station as a function of the reference charging parameters and the information from the electrical vehicle. This may be done depending on the capabilities of the charging regulator. This negotiation of charging parameters makes it possible to negotiate the optimal charging parameters with the electrical vehicle, according to the capabilities and requirements of the electrical vehicle and the restrictions of the reference charging parameters. Here, on the one hand, the requirements of the electrical vehicle for a particular quantity of energy can be accommodated. On the other hand, for example, a customer may have been contractually guaranteed a minimum charging amperage of 20 A. If so, this must be taken into account when negotiating the charging parameters while taking the reference charging parameters into account.

According to an embodiment, it is proposed that the group is allocated to at least one low-voltage transformer station of a low-voltage level. For example, such a transformer may provide a power of from 400 to 1000 kVA. This station power must be distributed intelligently between the charging stations connected to this transformer, which is done by creating a load prediction and determining reference charging parameters. An overload scenario can therefore be avoided in the low-voltage level.

For this reason, it is also proposed that the reference charging parameters should be determined as a function of the available electrical power of the low-voltage level and/or the medium-voltage level. When creating the load prediction and determining the reference charging parameters, the electrical power available in the low-voltage level may be taken into account. Furthermore, it is however also possible for the available power of the medium-voltage level to be taken into account. In a hierarchical structure, an overload can therefore be avoided in both the low-voltage level and the medium-voltage level by determining the reference charging parameters.

In order to be able to allocate the charging stations to a group, it is proposed that the group should have at least one group ID. With the aid of this group ID, it is possible to identify the group and permit communication between group members. This communication may for example be carried out by means of a communication medium, for example PLC, short-range radio or another network medium. Communication may also be carried out by means of mobile communication, for example between the vehicles, respectively the charging regulators with one another and the charging station or the charging stations with one another or between vehicles, charging stations and transformer stations. For example, the communication may be carried out by means of GSM, UMTS, GPRS, LTE or another mobile communication protocol. The communication language may, for example, be SML. Other communication languages, such as DLMS, XML, HTML or the like are also possible. With the aid of the group ID, the stations within the group can be addressed as belonging uniquely to this group.

According to an embodiment, it is proposed that the group ID is sent from a low-voltage transformer station to the connected charging stations and/or that a group ID is exchanged between charging stations connected to the same low-voltage transformer station. On the one hand, the low-voltage transformer station may act as a so-called "master" and ensure communication with the stations. In this case, the transformer station must be equipped with the suitable communication and computation means. The determination of the load prediction and the reference charging parameters may furthermore be carried out in such a station. On the other hand, however, it is also possible that, within a group of charging stations, a single charging station acts as a "master" and undertakes the monitoring and prediction functions, and all the other stations in the group receive information from this "master" station.

It would also be possible for each charging station within a group to communicate with all the other charging stations within the group, and for each charging station to determine a load prediction and must parameters for itself. This information may be circulated within the group, the group ID being used in order to be able to allocate the communication to the charging stations.

According to an embodiment, therefore, it is proposed that the load prediction and the reference charging parameters within the group are determined in the low-voltage transformer station or in a charging station.

According to an embodiment, it is also proposed that the exchange of the actual charging parameters comprises at least transmission of the actual charging parameters to the transformer station of the low-voltage system or to a charging station of the group. The actual charging parameters can therefore be sent either to the low-voltage transformer station or to at least one charging station in the group.

The aforementioned method may also be embodied as a computer program or as a computer program stored on a storage medium. In this case, a microprocessor in the vehicle, in the charging station and/or in the transformer station may be suitably programmed in order to carry out the respective method steps using a computer program.

The features of the methods and devices may be combined freely with one another. In particular, features of the dependent claims may be independently inventive on their own or by being freely combined with one another, while obviating the features of the independent claims.

BRIEF DESCRIPTION OF THE DRAWINGS

The subject matter of the invention will be explained in more detail below with the aid of a drawing which shows exemplary embodiments. In the drawing.

DETAILED DESCRIPTION OF THE INVENTION

Figure 1:
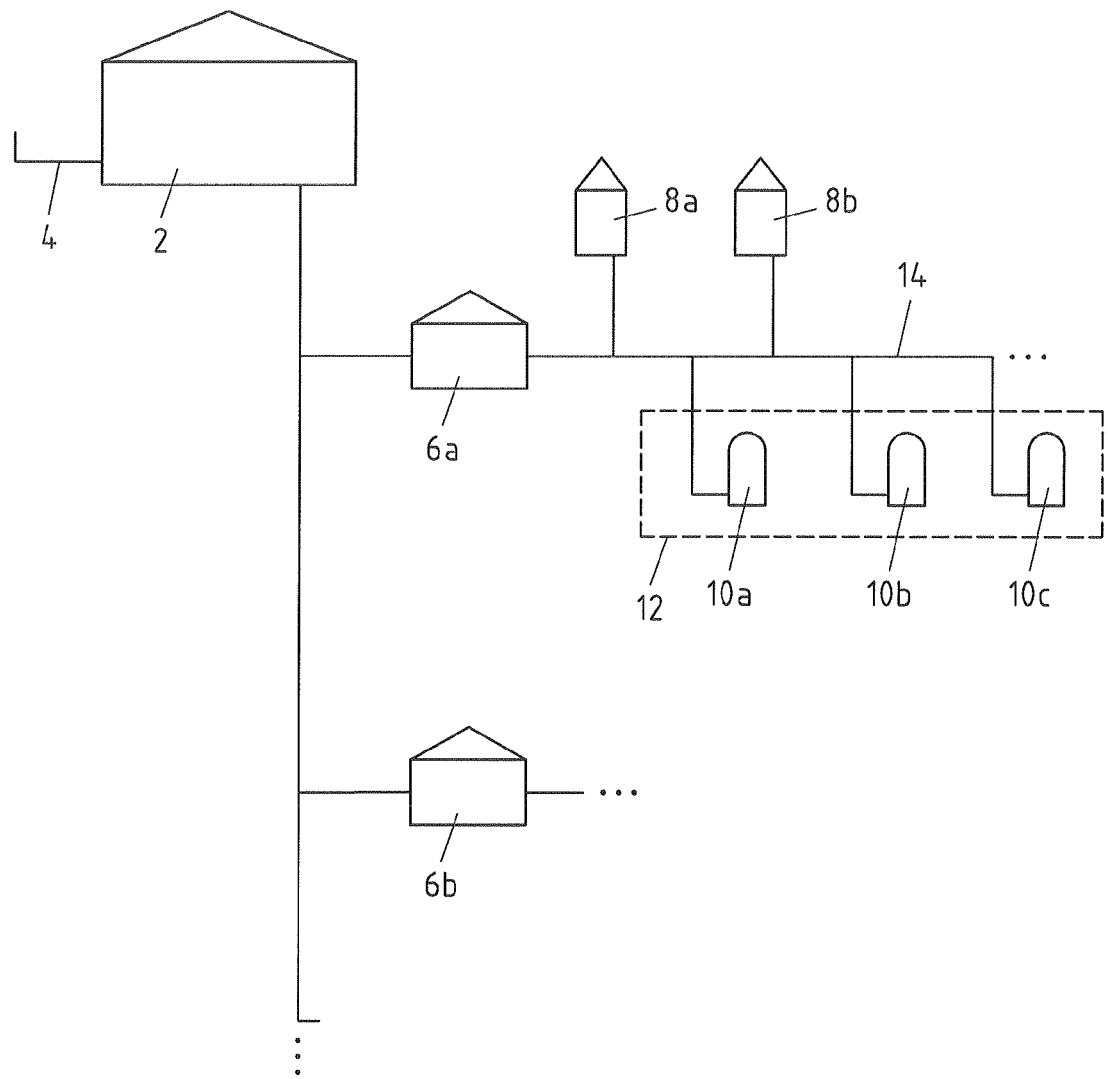
FIG. 1 shows a hierarchical structure of an energy supply network having a medium-voltage level, a low-voltage level, consumers and charging stations.

FIG. 1 shows a medium-voltage transformer station 2 which is connected to a high-voltage level 4 of utility network. The medium-voltage transformer station 2 supplies low-voltage transformation stations 6a, 6b with electrical energy. At the output of the low-voltage transformation stations 6, there is a voltage of 230 V/400 V which is made available to the consumers. The power of a low-voltage transformation station 6 generally lies between 400 and 1000 kVA. This power must be sufficient in order to supply all consumers, which are connected to the low-voltage transformer, with energy. The consumers include conventional household consumers 8 and charging stations 10.

In the region of a low-voltage transformation station 6, 100 or more charging stations 10 may be connected in the future in order to provide a sufficient supply of electrical vehicles with charging points. If all the charging stations 10 draw electrical power from the low-voltage transformation station 6 at the same time, then it may rapidly happen that the low-voltage transformation station 6 reaches its maximum power. It has, however, been discovered that electrical vehicles are parked for most of the day and connected to a charging station. Now, if the energy demand of the electrical vehicles over the course of the total parking time is covered, then the maximum power which the low-voltage transformation station 6 must make available can be reduced through intelligent control. By intelligent distribution of the power over the total parking time of the electrical vehicles, it is therefore possible to reduce the instantaneous power from more than 1000 kVA to about 100 kVA.

This is made possible by combining the charging stations 10 into groups 12, in which case a group 12 can be allocated to a low-voltage transformation station 6. Within the group 12, by evaluating actual charging parameters and through knowledge from the past about the power to be made available, and through present charging prediction within the vehicles, a load prediction is created with the aid of which reference charging parameters are determined which control the charging behaviour of the vehicles over the total parking time. Through this regulation of the charging parameters over the total parking time of the electrical vehicles, it is possible to take only a relatively low instantaneous power from the low-voltage transformation station 6, although this is done over a longer period of time so that the total energy demand for charging all the electrical vehicles existing in the group 12 is covered. Furthermore, by means of the load prediction and the reference charging parameters, an overload of the medium-voltage transformer station 2 is also avoided by creating a load prediction for the medium-voltage level and taking it into account when determining the reference charging parameters.

For the communication within the group and the exchange of actual charging parameters and reference charging parameters, it is necessary for a charging station 10 to be equipped accordingly.

Figure 2:
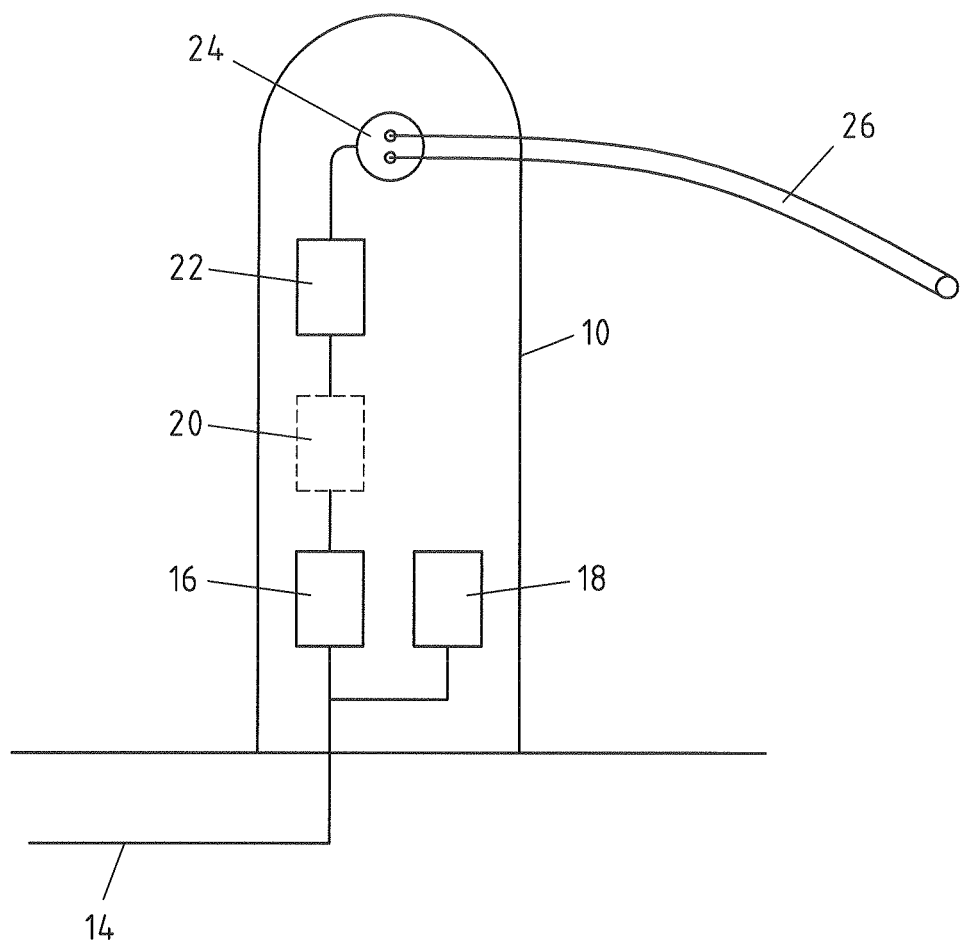
FIG. 2 schematically shows a structure of a charging station according to an embodiment.

FIG. 2 shows a charging station 10 in a schematic sectional view. The charging station 10 is connected by a cable 14 to a low-voltage transformation station 6. The charging station 10 is furthermore connected by the cable 14 to all the other charging stations 10 of the group 12. Communication between the charging stations 10 in the group 12 and between the charging stations 10 and the low-voltage transformation station 6 can be carried out via the cable 14. The communication may for example be carried out by means of powerline communication. The communication protocol may for example be SML, DLMS, XML, HTML or another standard. The communication may also be carried out wirelessly, for example by means of WLAN or mobile communication.

The charging station 10 contains a communication unit 16, a grouping unit 18, optionally a computation unit 20 and a charging control circuit 22. An electrical vehicle (not shown) can be connected to the charging station 10 via an electrical connection 24 and a charging cable 26.

The charging control circuit 22 permits communication via the charging cable 26 with the electrical vehicle and negotiation of charging parameters. The negotiation of charging parameters may contain at least the negotiation of a maximum charging amperage. It may furthermore contain other charging parameters, such as a charging duration, a current load curve, a minimum permissible charging amperage, a maximum permissible charging amperage, a charging period, information about an energy mix, contractual details and the like. The charging parameters can be sent by means of the charging control circuit 22 to the electrical vehicle and negotiated with the electrical vehicle. In the charging control circuit 22, it is furthermore possible to establish the actual charging parameters, in particular the present charging amperage.

In the charging control circuit 22 or in the electrical vehicle, a charging prediction may furthermore be created which can predict the charging duration and the required charging amperage, in order to charge the connected electrical vehicle fully or up to the required amount. The actual charging parameters, as well as the charging prediction, can be sent from the charging control circuit 22 to the communication unit 16.

The communication unit 16 allows communication via the cable 14 or another wired or wireless network, on the one hand with the other charging stations 10 and on the other hand with the low-voltage transformation station 6. By means of the communication unit 16, the actual charging parameters can be transmitted and reference charging parameters can be received.

The grouping unit 18 makes it possible to allocate the charging station 10 to a group 12. To this end, the grouping unit 18 may receive and/or transmit a group ID, so as to communicate its membership of a particular group 12.

Lastly, an optional computation unit 20 may be provided in the charging station 10. In the optional computation unit 20, for example, a load prediction as well as reference charging parameters may be calculated. The computation unit 20 may on the one hand optionally be arranged in a "master" charging station 10, in which case a "master" charging station 10 is provided in a group 12. It is also possible for a computation unit 20 to be provided in each charging station 10, and for each charging station 10 to create a load prediction and determine reference charging parameters autonomously for itself. This requires exchange of all the information, in particular the information about the actual charging parameters, between all the charging stations 10 within the group 12. The computation unit 20 may on the other hand be arranged in the low-voltage transformation station 6.

Figure 3:
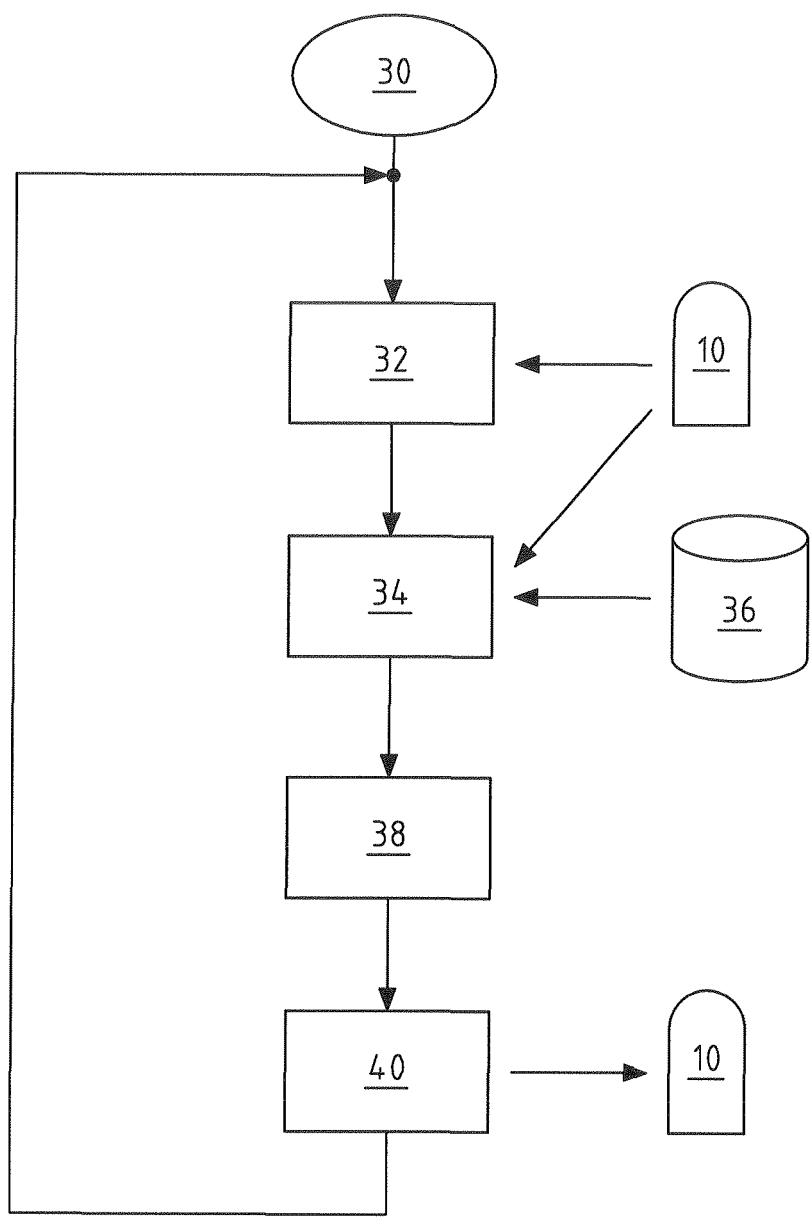
FIG. 3 schematically shows the procedure of a method according to an embodiment.

FIG. 3 describes the procedure of the method according to the subject-matter according to an embodiment.

In a first step, the charging stations 10 of a group 12 are grouped 30. To this end, the grouping units 18 communicate group IDs between the charging stations 10 so as to form a group 12.

After a group has been grouped (30), exchange 32 of actual charging parameters within the group is initiated. To this end, by means of the communication unit 16, each charging station 10 of the group 12 sends the actual charging parameter determined by the charging control circuit 22, which contains in particular the present charging amperage. The actual charging parameters of all the charging stations 10 of a group 12 are received in at least one computation unit 20. In the computation unit 20, at least with the aid of the actual charging parameters, a load prediction is created 34.

In order to create 34 the load prediction, a daily load curve or a weekly load curve, a monthly load curve as well as a yearly load curve may also be taken from a database 36. A charging prediction may also be received for creation 34 of the load prediction by the charging stations 10. The charging prediction may for example be created by means of a charging control circuit 22 or by means of a charging regulator in the electrical vehicle.

After the load prediction has been created 34, reference charging parameters are determined 38. Determination 38 of the reference charging parameters may for example contain the determination 38 of maximum charging amperage, charging durations, charging periods, a current load curve and/or the like. The reference charging parameters which have been determined are communicated 40 to the charging stations 10 of the group 12. The charging stations 10 receive the reference charging parameters by means of their communication units 16, and implement them by means of the charging control circuit 22 by negotiating corresponding charging parameters with the electrical vehicles for charging the electrical vehicles.

At intervals, the actual charging parameters are exchanged 32 and new load prediction are created 34, and the reference charging parameters are determined 38, so that it is a constantly possible to react to present power requirements.

By means of the method according to the subject-matter and the device according to the subject-matter, it is possible to reduce the demand on an utility network for the charging of electrical vehicles, by making electrical power available in a time-distributed fashion with the aid of load predictions.

The invention claimed is:

1. Method for controlling charging stations for electrical vehicles, comprising the steps of
    grouping at least two charging stations into a group, wherein several charging stations of the group are connected with a common transformer station,
    exchanging at least actual charging parameters of the charging stations within the group, wherein actual charging parameters comprise information regarding the currently provided electrical power at the charging station,
    exchanging a charging prediction being established by a charging controller being arranged in an electrical vehicle being connected to the charging station, comprising a current load curve for charging the electrical vehicle in the remaining duration of loading,
    estimating a future energy need of the common transformer station using a daily load curve of at least one charging station of the group from a database,
    creating a load prediction for the group as a function of at least the actual charging parameters, the charging prediction and the daily load curve,
    adaptively determining reference charging parameters, comprising at least a maximal charging amperage and a charging time for the charging stations of the group as a function of the load prediction, such that on the one hand the power provided by the charging stations of the group does not exceed a maximum transformer power and on the other hand the electrical vehicles connected to the charging stations of the group receive the power required for charging their batteries within their respective remaining charging durations, negotiating of charging parameters with the electrical vehicle depending on the reference charging parameters, wherein in the event of varying reference charging parameters, the charging parameters are renegotiated with the electrical vehicle during a charging phase.

2. Method of claim 1, wherein the actual charging parameters of the charging station contain at least one of information about present charging amperage and/or a charging regulator of the electrical vehicle connected to the charging station.

3. Method of claim 1, wherein the actual charging parameters are exchanged at intervals, and in that at least one of load predictions and/or must charging parameters are modified adaptively as a function of the present actual charging parameters.

4. Method of claim 1, wherein the reference charging parameters contain at least one of information about a charging duration, a current load curve and/or a quantity of energy.

5. Method of claim 1, wherein at the start of a charging process, at least one of information about a required quantity of energy, a preferred charging duration, a preferred charging time and/or a charging regulator is sent from an electrical vehicle to a charging station, and in that at least one of a maximum charging amperage, a charging period, a charging duration and/or a maximum charging duration are determined and communicated to the electrical vehicle by the charging station depending of the reference charging parameters and the information from the electrical vehicle.

6. Method of claim 1, wherein the reference charging parameters are determined as a function of the available electrical power of at least one of a low-voltage level and/or a medium-voltage level.

7. Method of claim 1, wherein the group has at least one group ID.

8. Method of claim 7, wherein the group ID is at least one of sent from a low-voltage transformer station to charging stations connected thereto, and/or exchanged between charging stations connected to the same low-voltage transformer station.

9. Method of claim 1, wherein the load prediction and the reference charging parameters within the group are determined in one of a low-voltage transformer station or in a charging station.

10. Method of claim 1, wherein the exchange of the actual charging parameters comprises at least one of transmission of the actual charging parameters to the transformer of the low-voltage system or to a charging station of the group.

11. Charging stations for electrical vehicles comprising:
allocation means for grouping the charging stations into a group of at least two charging stations, wherein several charging stations of the group are connected with a common transformer station,
communication means operable for exchanging at least actual charging parameters within the group, wherein actual charging parameters comprise information regarding the currently provided electrical power at the charging station, the communication means operable for exchanging a charging prediction being established by a charging controller being arranged in an electrical vehicle being connected to one of the charging stations, comprising a current load curve for charging the electrical vehicle in the remaining duration of loading, wherein in the event of varying reference charging parameters, the charging parameters can be renegotiated with the electrical vehicle during a charging phase,
the communication means operable for receiving reference charging parameters in order to determine charging parameters for the charging of electrical vehicles, wherein the reference charging parameters comprise a charging amperage and a charging time and are adaptively determined depending on a load prediction for the group depending on at least one of the current charging parameters, the charging prediction and daily load curve defining a future energy need of the transformer station of at least one charging station, such that on the one hand the power provided by the charging stations of the group does not exceed a maximum transformer power and on the other hand the electrical vehicles connected to the charging stations of the group receive the power required for charging their batteries within their respective remaining charging durations.

12. Charging stations for electrical vehicles comprising:
allocation means for grouping the charging station into a group of at least two charging stations, wherein several charging stations of the group are connected with a common transformer station,
communication means operable for receiving at least actual charging parameters from charging stations of the group, wherein actual charging parameters comprise information regarding the currently provided electrical power at the charging station, the communication means operable for exchanging a charging prediction being established by a charging controller being arranged in an electrical vehicle being connected to one of the charging stations, comprising a current load curve for charging the electrical vehicle in the remaining duration of loading,
computation means operable for estimating a future energy need of the transformer station using a daily load curve of at least one charging station of the group and for compiling a load prediction for the group depending on at least the received actual charging parameters, the charging prediction and the daily load curve and for adaptively determining reference charging parameters comprising a maximal charging amperage and a loading duration for the charging stations of the group depending on the load prediction, such that on the one hand the power provided by the charging stations of the group do not exceed a maximum transformer power and on the other hand the electrical vehicles connected to the charging stations of the group receive the power required for charging their batteries within their respective remaining charging durations, wherein
the communication means is configured to transmit must charging parameters to charging stations of the group.

13. Low-voltage transformer station comprising:
allocation means for grouping charging stations into a group of at least two charging stations, wherein several charging stations of the group are connected with a common transformer station,
communication means operable for receiving at least actual charging parameters from charging stations of the group, wherein the actual charging parameters comprise information regarding the currently provided electrical power at the charging station, the communication means operable for exchanging a charging prediction being established by a charging controller being arranged in an electrical vehicle being connected to one of the charging station, comprising a current load curve for charging the electrical vehicle in the remaining duration of loading, computation means for estimating a future energy need of the transformer station using a daily load curve of at least one charging station of the group and for compiling a load prediction for the group depending on at least the received actual charging parameters, the charging prediction and the daily load curve and for adaptively determining reference charging parameters comprising a maximal charging amperage and a loading duration for the charging stations of the group depending on the load prediction, such that on the one hand the power provided by the charging stations of the group do not exceed a maximum transformer power and on the other hand the electrical vehicles connected to the charging stations of the group receive the power required for charging their batteries within their respective remaining charging durations.

14. System comprising at least one charging station of claim 11, one charging station of claim 12, and/or a low-voltage transformer station of claim 13.

\* \* \* \* \*